(12) United States Patent
Saxena

(10) Patent No.: US 10,817,446 B1
(45) Date of Patent: Oct. 27, 2020

(54) OPTIMIZED MULTIPORT NVME CONTROLLER FOR MULTIPATH INPUT/OUTPUT APPLICATIONS

(71) Applicant: Mobiveil, Inc., Milpitas, CA (US)

(72) Inventor: Amit Saxena, Pleasanton, CA (US)

(73) Assignee: Mobiveil, Inc., Milpitas, CA (US)

( * ) Notice: Subject to any disclaimer, the term of this patent is extended or adjusted under 35 U.S.C. 154(b) by 367 days.

(21) Appl. No.: 15/131,669

(22) Filed: Apr. 18, 2016

Related U.S. Application Data

(60) Provisional application No. 62/155,194, filed on Apr. 30, 2015.

(51) Int. Cl.
  *G06F 13/28* (2006.01)
  *G06F 13/16* (2006.01)
  *G06F 13/40* (2006.01)

(52) U.S. Cl.
  CPC .......... *G06F 13/28* (2013.01); *G06F 13/1673* (2013.01); *G06F 13/4068* (2013.01)

(58) Field of Classification Search
  CPC ... G06F 13/28; G06F 13/1673; G06F 13/4068
  See application file for complete search history.

(56) References Cited

U.S. PATENT DOCUMENTS

| 2013/0198311 A1* | 8/2013 | Tamir | G06F 15/167 |
| | | | 709/212 |
| 2015/0169449 A1* | 6/2015 | Barrell | G06F 12/0862 |
| | | | 711/143 |
| 2018/0011812 A1* | 1/2018 | Morishita | G06F 12/0215 |

OTHER PUBLICATIONS

NVM Express Workgroup, "NVM Express Revision 1.2", Nov. 3, 2014, Published in: US.

* cited by examiner

*Primary Examiner* — Brian T Misiura
*Assistant Examiner* — Herve Iradukunda
(74) *Attorney, Agent, or Firm* — Bardmesser Law Group

(57) ABSTRACT

This provides an optimized multiport NVMe controller on a single die that significantly reduces area and gate count for multipath I/O requirements over prior implementations without compromising any performance requirements. The arrangement implements minimal logic per NVMe controller as per NVMe specification requirements and implements shared logic for all common functions. This results in the desired substantial savings in gate count and area. The optimized multiport NVMe controller is used in multipath I/O-based memory subsystem where multiple hosts access Namespaces through their own dedicated queues. Illustratively, the optimized multiport NVMe controller shares common logic among NVMe controllers, providing area efficient solution for multipath I/O implementations. Shared logic across all NVMe controllers are the DMA Engine (Hardware block which handles all NVMe commands based on PRP or SGL pointers), Firmware Request Queue (FWRQ), Firmware Completion Queue (FWCQ) and DMACQ (DMA Completion Queue).

14 Claims, 3 Drawing Sheets

OPTIMIZED MULTIPORT NVME CONTROLLER FOR MULTIPATH INPUT/OUTPUT APPLICATIONS

RELATED APPLICATION

This application claims the benefit of U.S. Provisional Application Ser. No. 62/155,194, entitled OPTIMIZED MULTIPORT NVMe CONTROLLER FOR MULTIPATH INPUT/OUTPUT APPLICATIONS, filed Apr. 30, 2015, the teachings of which are expressly incorporated herein by reference.

FIELD OF THE INVENTION

This invention relates to host controllers for data bus architectures implementing the Non-Volatile Memory Express (NVMe) standard.

BACKGROUND OF THE INVENTION

NVM Express (NVMe) or Non-Volatile Memory Host Controller Interface Specification (NVMHCI), is a specification for accessing solid-state drives (SSDs) attached through the PCI Express (PCIe) bus used in a variety of general purpose computing devices (computers), including servers and PCs. "NVM" stands as an acronym for non-volatile memory, which is used in SSDs. As a logical device interface, NVMe has been designed from the ground up, capitalizing on the low latency and parallelism of PCI Express SSDs, and mirroring the parallelism of contemporary CPUs, platforms and applications. By allowing parallelism levels offered by SSDs to be fully utilized by host's hardware and software, NVMe brings various performance improvements. The NVMe specification can be found in the document entitled NVM Express Revision 1.2, dated Nov. 3, 2014 by the NVM Express Workgroup (NVM Express, Inc. of Wakefield, Mass.), and available over the World Wide Web at http://nvmexpress.org.

NVM Express SSDs exist both in form of standard-sized PCI Express expansion cards and as 2.5-inch drives that provide a four-lane PCI Express interface through an SFF-8639 connector. SATA Express storage devices and the M.2 specification for internally mounted computer expansion cards also support NVMe as the logical device interface. NVMe implementations employ a scalable host controller that is typically associated with a single PCI Function. The controller more particularly implements a paired Submission Queue (SQ) and Completion Queue (CQ). Commands are placed by host software in the Request Queue and completed tasks are placed into the associated Completion Queue. An Admin Submission and Admin Completion Queue pair is provided to enable controller management and control (e.g. creation and deletion of Input/Output (I/O) Submission and Completion Queues, aborting commands, etc. Only commands that are part of the Admin Command Set can be submitted to the Admin Submission Queue. An I/O command set is used in an I/O queue pair. The NVMe specification defines one I/O Command Set, termed the NVM Command Set. The host selects one I/O Command Set that is used for all I/O queue pairs. Host software creates queues, up to the maximum supported by the controller. Typically the number of command queues created is based on the system configuration and anticipated workload. For example, on a four-core processor based system, there may be a queue-pair-per-core to avoid locking and ensure data structures are created in the appropriate processor core's cache—e.g. a 1:1 mapping between Submission Queues (SQs) and Completion Queues (CQs) can exist. This queue pair arrangement 100 is illustrated by way of background in FIG. 1 in which an Admin SQ and CQ are provided (110) and a plurality of (1-n) I/O SQs and CQs (120). The Queues interact with the NVMe controller 130 as shown. In another arrangement 200, shown in FIG. 2, multiple (1-n) I/O SQs 220 can utilize the same I/O CQ 222. Typically, there exists a 1:1 mapping between the Admin Submission Queue and Admin Completion Queue (210). All Queues interact with the NVMe controller 230 as shown.

An SQ is typically implemented as a circular buffer with a fixed slot size that the host software uses to submit commands for execution by the controller. The host software updates the appropriate SQ Tail doorbell register when there are one-to-n new commands to execute. The previous SQ Tail value is overwritten in the controller when there is a new doorbell register write. The controller fetches SQ entries in order from the SQ, however, it may then execute those commands in any order. Each SQ entry is a command. Commands are 64 bytes in size. The physical memory locations in memory to use for data transfers are specified using Physical Region Page (PRP) entries or Scatter Gather Lists. Each command may include two PRP entries or one Scatter Gather List (SGL) segment. If more than two PRP entries are necessary to describe the data buffer, then a pointer to a PRP List that describes a list of PRP entries is provided. If more than one SGL segment is necessary to describe the data buffer, then the SGL segment provides a pointer to the next SGL segment. A CQ is also typically a circular buffer with a fixed slot size used to post status for completed commands. A completed command is uniquely identified by a combination of the associated SQ identifier and command identifier that is assigned by host software. Multiple Submission Queues may be associated with a single SQ. This feature may be used where a single worker thread processes all command completions via one CQ even when those commands originated from multiple Submission Queues. The Head pointer is updated by host software after it has processed completion queue entries indicating the last free CQ entry. A Phase (P) bit is defined in the completion queue entry to indicate whether an entry has been newly posted without consulting a register. This enables host software to determine whether the new entry was posted as part of the previous or current round of completion notifications. Specifically, each round through the CQ entries, the controller inverts the Phase bit.

FIG. 3 shows a typical implementation of an NVMe subsystem 300. The depicted NVM-Express subsystem 300 uses a serial point to point link 310 for communication between the Host 310 and NVMe-compliant SSD controller 330. In a basic implementation, the NVMe controller 330 comprises of PCIe end point controller, 340, local CPU (with its Firmware) 360 and associated memory ((e.g. DDR DRAM) 362, 364, NVMe Controller 350, flash memory controller 370 and associated flash memory 372. This arrangement is only exemplary of a wide range of, often more-complex, implementations of an NVMe subsystem.

By way of further background, in computer storage, multipath I/O is a fault-tolerance and performance-enhancement technique that defines more than one physical path between the CPU in a computer system and its mass-storage devices through the buses, controllers, switches, and bridge devices connecting them. By way of example, a SCSI hard disk drive may connect to two SCSI controllers on the same computer, or a disk may connect to two Fibre Channel ports. Should one controller, port or switch fail, the operating system can route the I/O through the remaining controller, port or switch transparently and with no changes visible to the applications, other than perhaps resulting in increased latency. Multipath software layers can leverage the redundant paths to provide performance-enhancing features, including dynamic load balancing, traffic shaping, automatic path management, and dynamic reconfiguration.

In the case of SSDs, a multipath I/O arrangement using NMVe-based host controllers in prior implementations entails the use of separate, discrete controllers. In general, multi-path I/O in this context refers to two or more completely independent PCI Express paths between a single host and a namespace while namespace sharing refers to the ability for two or more hosts to access a common shared namespace using different NVMe controllers. Both multi-path I/O and namespace sharing require that the NVM subsystem contain two or more controllers. Concurrent access to a shared namespace by two or more hosts also requires coordination between hosts. In general, prior implementations of NVMe controllers multipath I/O disadvantageously employ large gate counts and associated complexity. It is desirable to optimize this architecture.

SUMMARY OF THE INVENTION

This invention overcomes disadvantages of the prior art by providing an optimized multiport NVMe controller that significantly reduces area and gate count for multipath I/O requirements over prior implementations without compromising any performance requirements. The arrangement implements minimal logic per NVMe controller as per NVMe specification requirements and implements shared logic for all common functions. This results in the desired substantial savings in gate count and area. The optimized multiport NVMe controller is used in multipath I/O-based memory subsystem where multiple hosts access Namespaces through their own dedicated queues. Illustratively, the optimized multiport NVMe controller shares common logic among NVMe controllers, providing area efficient solution for multipath I/O implementations. Shared logic across all NVMe controllers are the DMA Engine (Hardware block which handles all NVMe commands based on PRP or SGL pointers), Firmware Request Queue (FWRQ). Firmware Completion Queue (FWCQ) and DMACQ (DMA Completion Queue).

In an illustrative embodiment, an NVMe controller system for multipath I/O operations is provided. The system includes a plurality of NVMe controllers instantiated on a single die, with a common FWRQ operatively connected to the plurality of NVMe controllers, and a common FWCQ operatively connected to the plurality of NVMe controllers. Illustratively, a plurality of DMA engines and a common DMACQ are operatively connected to the plurality of NVMe controllers. A DMA data buffer is operatively connected to the DMA engines and associated with the plurality of NVMe controllers. A number of DMA engines associated with one or more of the NVMe controllers is illustratively configurable. In illustrative embodiments, each of the NVMe controllers has, operatively connected thereto, a respective Admin and I/O queue and/or independent command arbitration and error handling process modules.

In another illustrative embodiment, a method for controlling and NVMe system for multipath I/O operations is provided with respect to a plurality of NVMe controllers instantiated on a single die. The method handles data transmitted through the NVMe controllers with a common FWRQ operatively connected to the plurality of NVMe controllers, and transmitted through the NVMe controllers with a common FWCQ operatively connected to the plurality of NVMe controllers. The method operatively connects a plurality of DMA engines and a common DMACQ to the plurality of NVMe controllers, and handles data passing therethrough. Data is stored in a DMA data buffer operatively connected to the DMA engines and associated with the plurality of NVMe controllers. The method configures a desired number of DMA engines associated with one or more of the NVMe controllers. The method also transfers data between a respective Admin and I/O queue of the NVMe controllers. The method also operates, in the controllers, an independent command arbitration module and error handling process module

BRIEF DESCRIPTION OF THE DRAWINGS

The invention description below refers to the accompanying drawings, of which.

DETAILED DESCRIPTION

Figure 1:
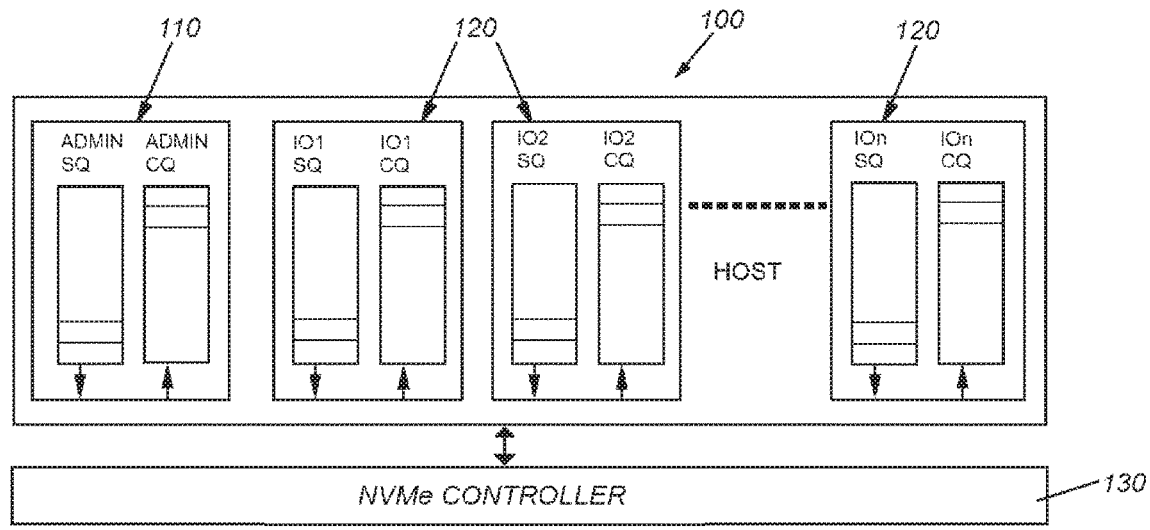
FIG. 1 is a block diagram of an arrangement of Admin and I/O submission and completion queues, showing an exemplary 1:1 correspondence between I/O submission and completion queues, according to the prior art.
Figure 2:
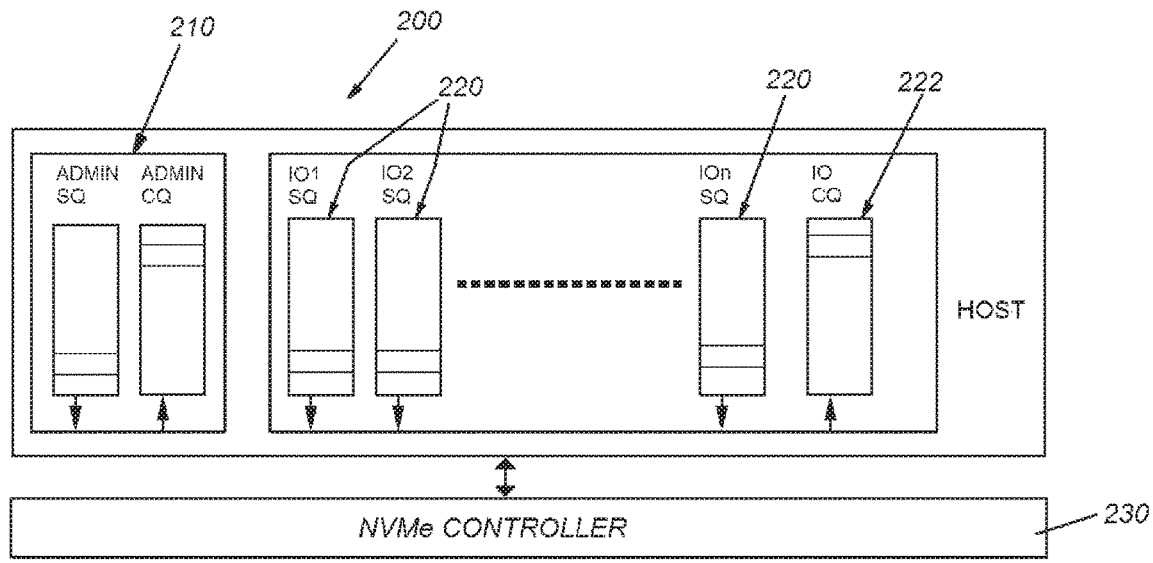
FIG. 2 is a block diagram of an alternate arrangement of Admin and I/O submission and completion queues, showing a single completion queue for a plurality of submission queues, according to the prior art.
Figure 3:
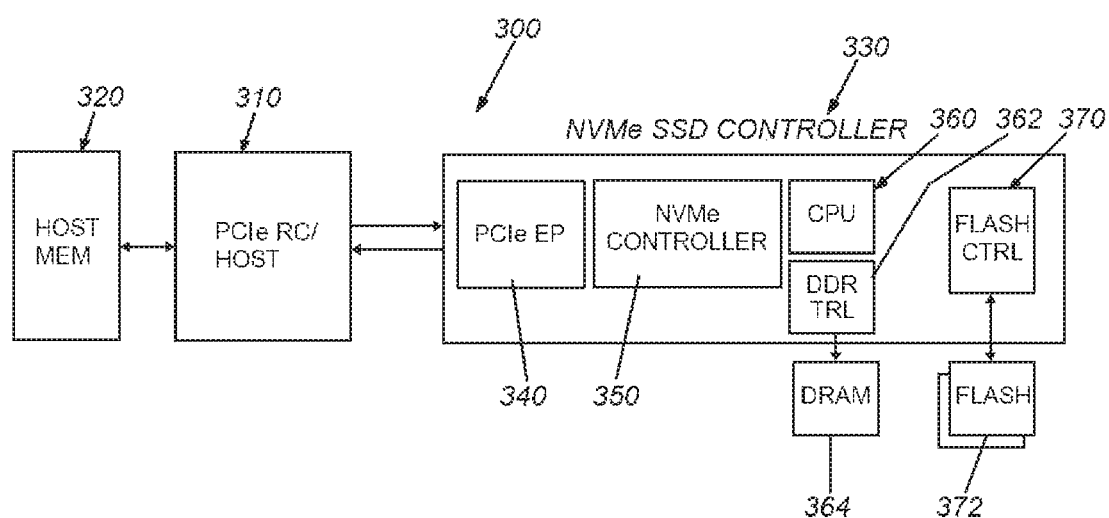
FIG. 3 is a block diagram of an arrangement of components for an exemplary NVMe subsystem, according to the prior art.
Figure 4:
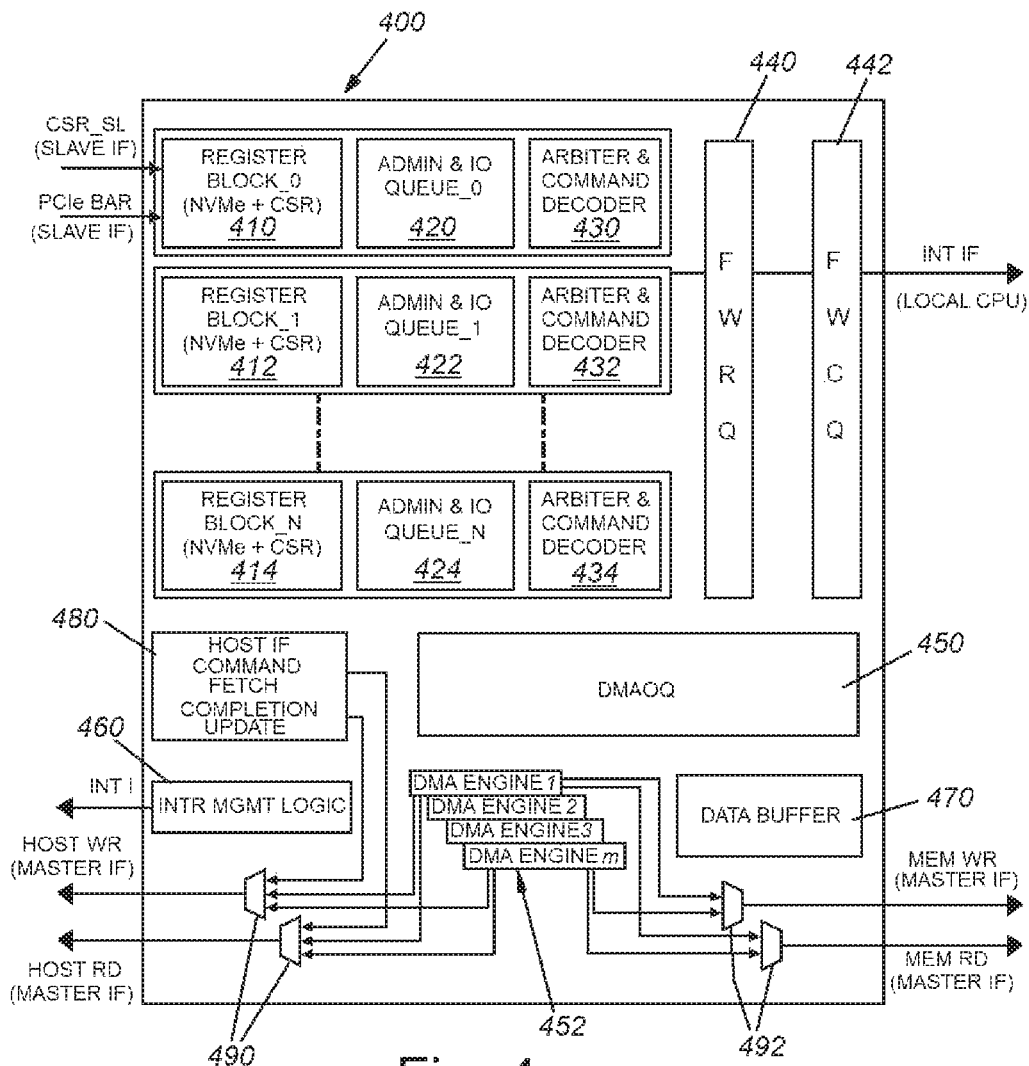
FIG. 4 is a block diagram of an optimized NVMe controller architecture for multiport/multipath I/O applications according to an illustrative embodiment.

Reference is made generally to FIG. 4, which shows an optimized NVMe controller architecture 400 for use with multiport/multipath I/O applications according to an illustrative embodiment. Before further describing the structure and function of the controller 400, the following glossary of terms is provided to assist in understanding the teachings herein:

Glossary of Terms

CQ Completion Queue

CFG Configuration Space Registers

CSR Control and Status registers—specific to the illustrative controller (UNEX).

DMACQ DMA Completion Queue. Queue which is shared by all DMA Engines for completions corresponding to NVMe commands completed by them.

DW Double Word, contains 4 bytes.

EAddress Address Used by one half (Eastern Half) of DMA Engine to perform either data fetch from local Memory subsystem or data update to local Memory subsystem.

EP End Point. Used for PCI Express device.

FWCQ FirmWare Completion Queue. Queue which keeps all completions received from FW (Local CPU) before these are passed to Host.

FWRQ FirmWare Request Queue. Queue which keeps all requests received from Host through Admin and IO Submission Queues for which a response needs to be generated through FWCQ by Local CPU before it consumes them.

GPEX Generic PCI Express Controller IP (Trademark of assignee, Mobiveil).

Host Enterprise/Client System Host.

HWCQ HardWare Completion Queue. Queue which keeps all completions generated locally by UNEX before these are passed to Host.

Local CPU Local Processor which works in conjunction with NVMe controller (UNEX) to provide full NVMe controller functionality.

MPS Maximum Payload Size when referred in PCI Express context.
  Memory Page Size when referred in NVMe context. Two are not related to each other.

Multiport NVM e Controller
  Assignee, Mobveil's illustrative (UNEX) Implementation supporting multiple NVMe controllers for Multipath IO usages.

PCIE/PEX PCI Express.

PM Power Management.

RC PCI Express Root Complex device.

RR Round Robin Arbitration mechanism.

SQ Submission Queue.

UNEX Assignee Mobiveil's Universal NVM EXpress Controller IP.

WAddress Address Used by one half (Western Half) of DMA Engine to either fetch data from host Memory subsystem or data update to host or local Memory subsystem. Also refer EAddress description above.

WRR Weighted Round Robin with Urgent Priority. Arbitration mechanism as defined in the NVMe specification.

Referring again to FIG. 4, an NVMe controller 400 for a multiport/multipath I/O implementation is shown and described. The controller 400 consists of a plurality (0-N) of NVMe and CSR register blocks 410, 412, 114, associated Admin and I/O queues 420, 422, 424 and Arbiter and command decoders 430, 432, 434. These blocks are operatively connected to a CSR and the PCIe bus interfaces. These interfaces are configured as appropriate Slave and Master interfaces (IF) in embodiments herein. All blocks share a single FWRQ 440 and FWCQ 442 that operatively connect to the local CPU via an appropriate interface.

As defined, a DMACQ 450 serves all DMA engines (1-M) 452 for completions corresponding to NVMe commands completed by them. The DMA engines can be descriptor or register-based. The DMA function serves to move data autonomously among host memory and local memory subsystem (Flash and/or Volatile (e.g. DRAM) memory). An interrupt (INTR) management logic 460 interconnects with an appropriate interface to generate interrupts as enabled by host. A data buffer arrangement 470 is provided to store incoming and outgoing data associated with operations of the NVMe commands from multiple NVMe controllers. This, in part, ensures no loss of data throughput. More particularly, the main controller memory is constituted by the data buffer 470.

Illustratively, a host interface 480 enables fetching of available commands from the submission queue (SQ) in the host memory and updating of available completions to completion queue (CQ) in the host memory. These outputs are combined, via combinatorial logic 490, 492, with outputs from the DMA engines 452 to define host write (Host WR), host read (Host RD), memory write (MEM WR) and memory read (MEM RD) signals.

To facilitate multiport/multipath I/O functionality within the NVMe controller 400, a specific data structure is provided for commands directed between the controller and the local CPU. The following 64-byte format is provided to local CPU as part of 64-byte command structure in Table 1 below. Reserved bytes 8 to 15 in the command word are used to provide Submission and corresponding Completion Queue ID fields of the overall command structure. The Local CPU illustratively provides the Completion Queue ID in return while submitting Completions through HW_CQ.

TABLE 1

64-Byte Command Structure

| Bytes | Description |
| --- | --- |
| 63:60 | SQ Command Bytes 63:60, Command DW15 (CDW15) |
| 59:56 | SQ Command Bytes 59:56, Command DW14 (CDW14) |
| 55:52 | SQ Command Bytes 55:52, Command DW14 (CDW13) |
| 51:48 | SQ Command Bytes 51:48, Command DW14 (CDW12) |
| 47:44 | SQ Command Bytes 47:44, Command DW14 (CDW11) |
| 43:40 | SQ Command Bytes 43:40, Command DW14 (CDW10) |
| 39:32 | SQ Command Bytes 39:32, PRP or SGL Entry |
| 31:24 | SQ Command Bytes 31:24, PRP or SGL Entry |
| 23:16 | SQ Command Bytes 23:16, MTPTR Entry |
| 15:13 | SQ Command Bytes 15:13, Reserved |
| 12 | SQ Command Bytes 12, Reserved for Single NVMe Controller Implementation. For Multiple NVMe Controller Implementation, these fields specify Controller Number for which command is available. 0 - NVMe controller0 1 - NVMe controller1 ... 63 - NVMe controller64 |
| 11:10 | SQ ID |
| 9:8 | CQ ID |
| 7:4 | SQ Command Bytes 7:4, NSID |
| 3:0 | SQ Command Bytes 3:0, CDW0 |

As a further part of the specific command structure employed in connection with multiport/multipath I/O functionality, the following 16-byte format, shown in Table 2, below (with 64 NVMe controllers, by way of non-limiting example) is illustratively provided by the local CPU as part of 16-byte completion structure. Reserved bytes 4 to 7 in the Completion Word should provide Completion Queue ID fields of completion. Additional information is provided by the local CPU in case of any Abort or Async Request Completions.

TABLE 2

16-Byte Completion Structure

| Bytes | Description |
| --- | --- |
| 15:12 | Completion DW3 |
| 11:8 | Completion Command DW2 |
| 7 | NVMe controller number. This is used when there are multiple NVMe from the NVMe controller for posting the completion. 0 - NVMe controller0 1 - NVMe controller1 ... 63 - NVMe controller64 |
| 6 | Bit 0 1 - ABORT Command Completion 0 - No ABORT Command Completion Bit 1 1 - ASYNC Request Notification Completion 0 - No ASYNC Request Completion |

TABLE 2-continued

16-Byte Completion Structure

| Bytes | Description |
|---|---|
|  | Bit 2 |
|  | 1 - Delete IO Submission Queue Completion |
|  | 0 - No Delete IO Submission Queue Completion |
|  | Bit 3 -Bit 7 |
|  | Reserved |
| 5:4 | CQID, this completion should use. Local CPU needs to provide this information based on CQID provided in FW_RQ. |
| 3:0 | Byte 6, Bit 2 = 1 |
|  | Byte 0 & 1 carry Queue Identifier for which |
|  | Delete IO Submission |
|  | Queue command is completed. |
|  | Byte 2 & 3 - Reserved. |
|  | Byte 6, Bit 2 = 0 |
|  | Command Specific DW0 |

To facilitate NVMe command execution from multiple NVMe controllers (with 64 NVMe controllers, by way of non-limiting example) by any DMA Engine, Local CPU illustratively provides NVMe controller number information in Command Descriptor (DW) in 64-byte structure as shown in Table 3.

TABLE 3

64-Byte DMA Command Descriptor

| DW | Description |
|---|---|
| 15:14 | Contains 64 Bit Address for Next Descriptor. It is 16DW Aligned.<br>Refer to Table 3A and Table 3B. |
| 13:12 | Contains 64 Bit Address for MetaData Pointer Address.<br>Refer to Table 3C and Table 3D. |
| 11:10 | Contains Protection check specific information.<br>Refer to Table 3E and Table 3F. |
| 9 | Contains Completion Identifier and Submission Queue Identifier.<br>Refer to Table 3G. |
| 8:7 | Contains 64 Bit Address for DMA EAddress. EAddress is Byte Aligned and is used by DMA Engine to fetch or update data from specified address from local CPU's memory based on DMA Operation defined in Descriptor Control DW Region (DW0).<br>Refer to Table 3H and Table 3I. |
| 6:3 | Contains 128 Bit Address information for DMA WAddress. WAddress has either Host Memory's PRP or SGL Pointer values or Local Memory's address used by DMA Engine to fetch or update data from host or local memory specified address based on DMA Operation defined in Descriptor Control DW Region (DW0).<br>Refer to Table 3J. |
| 2 | Contains DMA Transfer Length DW.<br>Refer to Table 3K. |
| 1 | Contains Status/Control DW.<br>Refer to Table 3L. |
| 0 | Contains Control DW.<br>Refer to Table 3M. |

The details of Table 3 are now described. 3.5.6 DMA Next Descriptor Address HIGH (DW15)

The region DMA Next Descriptor Address HIGH (DW15) in the Descriptor contains the Upper 32 bits of the address of the local memory where next descriptor is located.

TABLE 3A

UNEX_DMA_DESC_NXT_DESC_HIGH (DW15)

| Bits | Type | Reset | Description |
|---|---|---|---|
| 31:0 | RW | 0 | Next Descriptor Address Indicates the Upper 32 bit address of the next descriptor. (Not applicable for register based DMA). Valid only if next_desc_ptr valid is set in Descriptor DW0. |

The region DMA Next Descriptor Address LOW (DW14) in the Descriptor contains the lower 26 bits of the address of the local memory where next descriptor is located.

TABLE 3B

UNEX_DMA_DESC_NXT_DESC_LOW (DW14)

| Bits | Type | Reset | Description |
|---|---|---|---|
| 31:6 | RW | 0 | Next Descriptor Address. Indicates the lower 26 bit address of the next descriptor. (Not applicable for register based DMA). Valid only if next_desc_ptr valid is set in Descriptor DW0. Descriptors are arranged at 16DW boundary in memory. |
| 5:0 | RO | 0 | Reserved |

The region MetaData Pointer Address HIGH (DW13) in the Descriptor contains the Upper 32 bits of the address of the host memory where Metadata is located.

TABLE 3C

UNEX_DMA_DESC_METADATA_PTR_ADDRESS_HIGH (DW13)

| Bits | Type | Reset | Description |
|---|---|---|---|
| 31:0 | RW | 0 | Metadata Pointer Address High. Indicates the Upper 32 bit address of the Metadata Pointer address in Host Memory. Used if MetaData is located separately from logical block data. |

The region MetaData Pointer Address LOW (DW12) in the Descriptor contains the lower 32 bits of the address of the host memory where Metadata is located.

TABLE 3D

NEX_DMA_DESC_METADATA_PTR_ADDRESS_LOW (DW12)

| Bits | Type | Reset | Description |
|---|---|---|---|
| 31:0 | RW | 0 | Metadata Pointer Address Low. Indicates the Lower 32 bit address of the Metadata Pointer address in Host Memory. Used if MetaData is located separately from logical block data. |

The region Initial Logical Block Reference Tag (DW11) in the Descriptor contains Initial Logical Block Reference Tag (ILBRT) for End to End Data protection.

TABLE 3E

UNEX_DMA_DESC_ILBRT (DW11)

| Bits | Type | Reset | Description |
|---|---|---|---|
| 31:0 | RW | 0 | 32 Bit ILBRT field of the Command. ILBRT. Used if End to End Data Protection is enabled for this DMA transfer. |

The region Logical Block Application Tag and Mask (DW10) in the Descriptor contains the Logical Block application Tag and Logical Block Application Tag Mask field for end to end data protection.

TABLE 3F

UNEX_DMA_DESC_LBAT (DW10)

| Bits | Type | Reset | Description |
|---|---|---|---|
| 31:16 | RW | 0 | Logical Block Application Tag Mask (LBATM): This field indicates the Application Tag Mask value. Used if End to End Data Protection is enabled for this DMA transfer. |
| 15:0 | RW | 0 | Logical Block Application Tag (LBAT): This field indicates the Application Tag value. Used if End to End Data Protection is enabled for this DMA transfer. |

The region NVMe Completion Parameter (DW9) in the Descriptor contains the Completion parameters in case DMA is tasked to generate completion after finishing the transfer.

TABLE 3G

UNEX_DMA_COMPL_PARAMS

| Bits | Type | Reset | Description |
|---|---|---|---|
| 31:16 | RW | 0 | SQ Identifier (SQID): Indicates the Submission Queue to which the associated command was issued to. Local CPU needs to set this based on SQID in the Command. Used when DMA is tasked to generate completion after completing data transfer. |
| 15:0 | RW | 0 | Command Identifier (CID): Indicates the identifier of the command that is being completed. Local CPU needs to set this based on CID in the Command. Used when DMA is tasked to generate completion after completing data transfer. |

The region DMA Descriptor EAddress HIGH (DW8) in the Descriptor contains the upper 32 bits of the EAddress. EAddress is used by DMA Engine to fetch or update data from specified address in local CPU's memory based on DMA Operation defined in Descriptor Control DW region.

TABLE 3H

UNEX_DMA_DESC_EADDR_HIGH (DW8)

| Bits | Type | Reset | Description |
|---|---|---|---|
| 31:0 | RW | 0 | EAddress Upper Address. Indicates the Upper 32 bit address of the EAddress. |

The DMA Descriptor EAddress LOW (DW7) region in the Descriptor contains the Lower 32 bits of the EAddress. EAddress is used by DMA Engine to fetch or update data from specified address in local CPU's memory based on DMA Operation defined in Descriptor Control DW region.

TABLE 3I

UNEX_DMA_DESC_EADDR_LOW (DW7)

| Bits | Type | Reset | Description |
|---|---|---|---|
| 31:0 | RW | 0 | EAddress Lower Address. Indicates the Lower 32 bit address of the EAddress. |

The region DMA Descriptor WAddress (DW6:DW3) in the Descriptor contains the Upper 128 bits of the WAddress. WAddress is used by DMA Engine to either fetch or update data from/to specified address either from Host or local CPU's memory based on DMA Operation defined in Descriptor Control DW region.

TABLE 3J

UNEX_DMA_DESC_WADDR (DW6:DW3)

| Bits | Type | Reset | Description |
|---|---|---|---|
| 127:0 | RW | 0 | Based on WADDR_PTR_TRUE and SGL_TRUE bit fields either lower 8 bytes are used as physical address or 128 bits are used to form physical address for DMA operation. <br><br> WADDR_PTR_TRUE  SGL_TRUE  WAddress <br> 0  X  Use Lower 8 bytes as WAddr <br> 1  0  PRP1 and PRP2 Entries <br> 1  1  SGL 1 Entry |

The region DMA Descriptor Length (DW2) in the Descriptor contains the DMA Transfer Size. Refer to DW0 [8] field description for definition of this field.

TABLE 3K

UNEX_DMA_DESC_LENGTH (DW2)

| Bits | Type | Reset | Description |
|---|---|---|---|
| 31:0 | RW | 0 | DMA Transfer Length Field. 1 DMA transfer may involve non-contiguous accesses to Non Volatile Memory as well as Host Memory region. In case of non-contiguous access to Non Volatile Memory (Local) region, 1 DMA transfer involves multiple scatter gather descriptors. Each of these descriptors describe part of DMA transfer length in DW0[31:16] Bit field. This field however should have same value in all such scatter gather descriptors describing DMA transfer length. |

The DMA Descriptor Status/Ctrl (DW1) region in Descriptor is used by DMA Engine to provide status about DMA operation. Few bits also provide additional control information for DMA Operation.

TABLE 3L

UNEX_DMA_DESC_STAT_CTRL (DW1)

| Bits | Type | Reset | Description |
|---|---|---|---|
| 31:26 | RW | 00h | NVMe controller number. This is used when there are multiple NVMe controllers in the UNEX Core. This is used to fetch the TO Queue parameters from the NVMe controller for posting the completion.<br>0 - NVMe controller 0<br>1 - Nvme controller 1<br>. . .<br>63 - NVMe controller 64<br>For Single Controller support, these fields are reserved. |
| 25 | RW | 0 | WADDR_PTR_TRUE: Indicates if WAddress has physical address (Lower 8 bytes) or Pointers to PRP or SGL entries.<br>0 - WAddress has physical address (Lower 8 bytes)<br>1 - WAddress has PRP or SGL Pointers, See SGL_TRUE below. |
| 24 | RW | 0 | SGL_TRUE: Indicates if WAddress has Scatter Gather List Entry or Physical Region Page Entry. Valid only if WADDR_PTR_TRUE is 1.<br>0 - WAddress has PRP2 and PRP1 Entries<br>1 - Waddress has SGL Entry |
| 23 | RW | 0 | SGL_PHY_ADDR_TRUE: Indicates if MetaData Pointer specified in Descriptor DW12 & DW11points to contiguous physical buffer or segment.<br>0 - Meta data pointer is pointing to segment<br>1 - Meta data pointer is the address of contiguous physical buffer data |
| 22 | RsvdP | 0 | RESERVED |
| 21 | RW | 0 | MD_TRUE:<br>1: Metadata needs to be accounted for during DMA transfer. See MDPTR_TRUE definition below.<br>0: MetaData is not present for this transfer. Only LBA data is used during DMA transfer. |
| 20 | RW | 0 | MDPTR_TRUE: Valid only if MD_TRUE is set to 1.<br>1: MetaData Pointer specified in Descriptor DW12 & DW11 points to MetaData.<br>0: MetaData is contiguous to LBA Data. |
| 19:16 | RW | 00h | PROT_INF: Valid only if MD_TRUE & E2E_PROT_TRUE are set to 1. |

TABLE 3L-continued

UNEX_DMA_DESC_STAT_CTRL (DW1)

| Bits | Type | Reset | Description |
|---|---|---|---|
| | | | [19] - Protection Information Action (PRACT): The protection information action field indicates the action to take for the protection information. If this field is set to '1', the protection information is stripped (read) or inserted (write). If this field is cleared to '', the protection information is passed.<br>[18] - If set to '1' enables protection information checking of the Guard field. If cleared to '0', the Guard field is not checked.<br>[17] - If set to '1' enables protection information checking of the Applica- tion Tag field. If cleared to '0', the Application Tag field is not checked.<br>[16] - If set to '1' enables protection information checking of the Logical Block Reference Tag field. If cleared to '0', the Logical Block Reference Tag field is not checked. |
| 15:12 | RW | | LBA Data Size:<br>0000 -  512 bytes<br>0001 -  1024 Bytes<br>0010 -  2048 Bytes<br>0011 -  4096 Bytes<br>0100 -  8192 Bytes<br>0101 - 16384 Bytes<br>Other - Reserved |
| 11 | RO | 0 | DMA Data Write Error, This bit is set by hardware to indicate that there was an error during data Write operation. |
| 10 | RO | 0 | End to End Reference Tag Check Error: DMA finds End to End Reference Tag Check Error |
| 9 | RO | 0 | End to End Application Tag Check Error: DMA finds End to End Application Tag Check Error |
| 8 | RO | 0 | End to End Guard Check Error: DMA finds End to End Guard check Error |
| 7 | RO | 0 | DMA SGL Descriptor Type Invalid: DMA finds that the type of an SGL Descriptor is a type that is not supported by UNEX. |
| 6 | RO | 0 | DMA Metadata SGL Length Invalid: DMA finds that the length of a Metadata SGL is too short or too long. |
| 5 | RO | 0 | DMA Data SGL Length Invalid: DMA finds that the length of a Data SGL is too short or too long. |
| 4 | RO | 0 | DMA Invalid Number of SGL Descriptors. The DMA command finds that the number of SGL Segment descriptors or SGL Last Segment descriptors in a SGL segment is greater than one. |
| 3 | RO | 0 | DMA Invalid SGL Last Segment Error. The DMA command finds an invalid SGL Last Segment. This may occur when the SGL segment pointed to by an SGL Last Segment descriptor contains an SGL Segment descriptor or an SGL Last Segment descriptor. This may occur when an SGL Last Segment descriptor contains invalid length (i.e., a length of zero or one that is not a multiple of 16). |
| 2 | RO | 0 | DMA Data Fetch Error, This bit is set by hardware to indicate that there was an error during data fetch operation. |
| 1 | RO | 0 | UNEX Data Compare Error, This bit is set by hardware to indicate that DMA operation (2'b 11) could not be completed successfully because a bridge error has occurred. |
| 0 | RO | 0 | DMA Done, This bit is set by hardware after completing the transaction for the current descriptor. |

The DMA Descriptor Control (DW0) is described in accordance with the following table.

TABLE 3M

UNEX_DMA_DESC_CTRL (DW0)

| Bits | Type | Reset | Description |
|---|---|---|---|
| 31:16 | RW | 0 | NVM Transfer Size in terms of LBA size (0 based value), Valid when DW0[9] is set to 1. For a DMA transfer which involves multiple Scatter Gather descriptors, Sum of individual NVM transfer size in scatter gather descriptor chain should match with Transfer length field in each of the scatter gather descriptor. |
| 15:14 | RO | 0 | Reserved |
| 13:10 | RW | 0 | MetaData Size per LBA: 0000 - 8 bytes 0001- 16 Bytes 0010 - 32 Bytes 0011 - 64 Bytes Other -Reserved |
| 9$^a$ | RW | 0 | Local Memory Subsystem Non Contiguous Addressing True. 0 - Local Memory Subsystem accesses for DMA transfer are to contiguous region. Current Descriptor describes complete DMA transfer. 1 - Local Memory Subsystem accesses for DMA transfer are to non- contiguous region. Current Descriptor describes partial DMA transfer. This bit should be set when Read or Write access is to NVM region and involves multiple non-contiguous LBA regions. When a DMA transfer involves multiple descriptors, care should be taken such that all such descriptors have same fields except bits DW0[31:16] and one of the DMA addresses (EAddress in case of , RDMA WDMA, CDMA or WAddress in case of LDMA). |
| 8 | RW | 0 | DMA Transfer Size control. 0 - Transfer Size (DW2) is in terms of LBA size (0 based value), DW2[31:16] are reserved. 1 - Transfer size is in terms of DW (4 bytes). |
| 7 | RW | 0 | E2E_PROT_TRUE: Valid only if MD_TRUE is set to 1. 1: E2E Protection is enabled. 0: E2E Protection is not enabled. |
| 6 | RW | 0 | E2E_PROT_LOC: Valid only if 2E_PROT_TRUE is set to 1. 1: E2E protection Data is first 8 bytes of MetaData. 0: E2E protection Data is last 8 bytes of MetaData. |
| 5 | RW | 0 | Generate Completion towards NVMe Host after completing DMA transfer. 1: Generate Completion. 0: Don't generate Completion. |
| 4:3 | RW | 0 | DMA Operation. 00: WDMA (Host memory to Local Memory Subsystem). EAddress Descriptor Value: Destination Address in Local CPU's Memory space. WAddress Descriptor Value: Source Address in Host Memory Space. 01: RDMA (Local Memory Subsystem to Host Memory). EAddress Descriptor Value: Source Address in Local CPU's Memory space. WAddress Descriptor Value: Destination Address in Host Memory Space. 10: LDMA (Local Memory Subsystem to Local Memory Subsystem). EAddress Descriptor Value: Source Address in Local CPU's Memory space. WAddress Descriptor Value: Destination Address in Local CPU's Memory Space. 11: CDMA (Compare). EAddress Descriptor Value: Source Address in Local CPU's Memory space. WAddress Descriptor Value: Source Address in Host Memory Space. |
| 2 | 1 | Control | End of Chain, Only Used in Descriptor Mode DMA. |
| 1 | 1 | Control | Next Descriptor Pointer — Valid. This bit is set by software to indicate that a descriptor has valid next descriptor pointer specified in DW14 and DW13. When this bit is 0 it means that the address of the next descriptor is implicitly specified. Only Used in Descriptor Mode DMA. |
| 0 | 1 | Control | Valid. This bit is set by software to indicate that a descriptor is valid and has the information related to data transfer. |

Illustratively, each DMA Engine performs specific DMA function as described in Control DWs (DW0 and DW1) of its descriptor at any given time once it is enabled for DMA operation.

In case of Descriptor mode DMA, the local CPU creates a descriptor chain in its memory space and enables the DMA Engine. The DMA Engine fetches the descriptor from the linked list of the descriptor chain one-at-a-time, and saves a copy of the fetched descriptor in HW. It performs DMA function as defined in the descriptor and updates status back in the descriptor in the Local CPU memory when it completes the DMA operation. A local copy of the current descriptor can be accessed by the local CPU through an indirect Descriptor access mechanism.

Note that each of the above-described tables references an illustrative data structure that can vary in, organization, data content, overall length and/or descriptor size in various embodiments. The listed values are, thus, exemplary of a wide range of possible arrangements to carry out similar functions. In general, data structures follow standard arrangements where applicable, as provided, for example in the NVMe specification described above.

It should be clear that the above-described optimized NVMe controller architecture for multiport/multipath operation provides a plurality of features and advantages over prior implementations. Among new and novel features and advantages is the implementation of NVMe-specification-defined registers for each of the NVMe controllers and independent Admin and I/O Queues for each NVMe controller as per NVMe specification. The illustrative architecture also implements independent command arbitration and error handling for each NVMe controller as per NVMe specification and a configurable number of DMA Engines and associated DMA data buffer which are shared across all NVMe controllers. Notably, the architecture implements a common FWRQ for all NVMe controllers, a common FWCQ for all NVMe controllers and a common DMACQ for all DMA Engines shared across all NVMe controllers for optimized design efficiency. Also notably, the architecture shares the same interface modules (host and memory subsystem) across all NVMe controllers for further optimization of the overall design.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. An NVMe controller system for multipath I/O operations comprising:
    a plurality of NVMe controllers instantiated on a single die, and wherein all the NVMe controllers share a memory;
    a common Firmware Request Queue (FWRQ) operatively connected to the plurality of NVMe controllers, wherein all submission requests are sent to the common FWRQ; and
    a common Firmware Completion Queue (FWCQ) operatively connected to the plurality of NVMe controllers, wherein all completions are received by the common FWCQ,
    wherein each NVMe controller is connected to a host through a PCIe interface, and wherein the host identifies a particular NVMe controller to fetch the submission requests and post the completions.

2. The NVMe controller system as set forth in claim 1, further comprising a plurality of DMA engines on the single die and a common DMA Completion Queue (DMACQ) operatively connected to the plurality of NVMe controllers.

3. The NVMe controller system as set forth in claim 2, further comprising a DMA data buffer operatively connected to the plurality of DMA engines and shared by the plurality of NVMe controllers.

4. The NVMe controller system as set forth in claim 3 wherein at least one of the plurality of DMA engines associated with one or more of the NVMe controllers is configurable.

5. The NVMe controller system as set forth in claim 1 wherein each of the NVMe controllers has, operatively connected thereto, a respective Admin and I/O queue.

6. The NVMe controller as set forth in claim 1 wherein each of the NVMe controllers has, operatively connected thereto, independent command arbitration and error handling process modules.

7. A method for controlling and NVMe system for multipath I/O operations comprising the steps of:
    providing a plurality of NVMe controllers instantiated on a single die, and wherein all the NVMe controllers share a memory;
    handling data transmitted through the NVMe controllers with a common Firmware Request Queue (FWRQ) operatively connected to the plurality of NVMe controllers, wherein all submission requests are sent to the common FWRQ; and
    handling data transmitted through the NVMe controllers with a common Firmware Completion Queue (FWCQ) operatively connected to the plurality of NVMe controllers, wherein all completions are received by the common FWCQ,
    wherein each NVMe controller is connected to a host through a PCIe interface, and wherein the host identifies a particular NVMe controller to fetch the submission requests and post the completions.

8. The method as set forth in claim 7, further comprising, operatively connecting a plurality of DMA engines on the single die and a common DMA Completion Queue (DMACQ) to the plurality of NVMe controllers and handling data passing therethrough.

9. The method as set forth in claim 8, further comprising, storing data in a DMA data buffer operatively connected to the plurality of DMA engines and shared by the plurality of NVMe controllers.

10. The method as set forth in claim 8 further comprising configuring at least one of the plurality of DMA engines associated with one or more of the NVMe controllers.

11. The method as set forth in claim 7 further comprising transferring data between a respective Admin and I/O queue of the NVMe controllers.

12. The method as set forth in claim 7 further comprising operating, in the controllers, an independent command arbitration module and error handling process module.

13. The system method of claim 7, wherein the common FWRQ is configured to keep all requests received from Host through Admin and TO Submission Queues.

14. The system method of claim 7, wherein the common FWCQ is configured to keep all completions received from a firmware running on the CPU.

* * * * *